United States Patent
Hayashi et al.

(10) Patent No.: US 6,198,562 B1
(45) Date of Patent: Mar. 6, 2001

(54) MULTI-BEAM SCANNING DEVICE AND IMAGE FORMING SYSTEM AND METHOD USING THE SAME

(75) Inventors: Yoshinori Hayashi; Atsushi Kawamura, both of Kanagawa (JP)

(73) Assignee: Ricoh Co., Ltd., Tokyo (JP)

( * ) Notice: Subject to any disclaimer, the term of this patent is extended or adjusted under 35 U.S.C. 154(b) by 0 days.

(21) Appl. No.: 09/454,148

(22) Filed: Dec. 3, 1999

(30) Foreign Application Priority Data

Mar. 3, 1999 (JP) ................................. 11-055331

(51) Int. Cl.$^7$ .................................... G02B 26/08

(52) U.S. Cl. .......................... 359/204; 359/216; 347/243

(58) Field of Search .................................... 359/196, 204, 359/205, 216, 217, 218, 219; 347/233, 241, 243, 244

(56) References Cited

U.S. PATENT DOCUMENTS

| | | | |
|---|---|---|---|
| 5,014,075 | * 5/1991 | Okino | 347/243 |
| 5,532,726 | * 7/1996 | Goto et al. | 347/243 |
| 5,557,448 | 9/1996 | Endo et al. | |
| 5,570,224 | 10/1996 | Endo et al. | |
| 5,581,392 | 12/1996 | Hayashi | |
| 5,652,670 | 7/1997 | Hayashi | |
| 5,724,087 | * 3/1998 | Sugano et al. | 347/243 |
| 5,875,051 | 2/1999 | Suzuki et al. | |

FOREIGN PATENT DOCUMENTS

| | | |
|---|---|---|
| 8-304722 | 11/1996 | (JP) . |
| 9-146024 | 6/1997 | (JP) . |

OTHER PUBLICATIONS

U.S. Ser. No. 09/239,686, filed Jan. 29, 1999.
U.S. Ser. No. 09/060,769, filed Apr. 15, 1998.
U.S. Ser. No. 09/324,077, filed Jun. 1, 1999.
U.S. Ser. No. 09/031,410, filed Feb. 26, 1998.
U.S. Ser. No. 09/021,595, filed Feb. 10, 1998.
U.S. Ser. No. 08/927,892, filed Sep. 11, 1997.
U.S. Ser. No. 08/333,209, filed Jun. 15, 1999.
U.S. Ser. No. 09/344,633, filed Jun. 25, 1999.
U.S. Ser. No. 09/233,884, filed Jan. 20, 1999.
U.S. Ser. No. 09/107,211, filed Jun. 30, 1998.
U.S. Ser. No. 09/177,658, filed Oct. 23, 1998.

* cited by examiner

Primary Examiner—Darren Schuberg
(74) Attorney, Agent, or Firm—Greenberg Traurig LLP

(57) ABSTRACT

A multi-beam scanning device includes a plurality of light sources which emit multiple beams. A plurality of coupling lenses couple the multiple beams from the light sources. A converging lens device converts the coupled beams into converging beams, the converging beams being elongated in a direction corresponding to a main scanning direction and converging only in a direction corresponding to a sub-scanning direction, at least two of the converging beams forming a difference angle therebetween. A rotary deflector has a reflection surface rotated about a fixed rotation axis. The reflection surface deflects the converging beams while the reflection surface is rotated. A scanning lens device scans an image surface in the main scanning direction at a substantially uniform velocity by focusing each deflected beam into a beam spot on the image surface. The multi-beam scanning device is configured to satisfy desired conditions to allow the multi-beam scanning device to achieve excellent optical characteristics without using a polarization beam splitter. Further, an image forming system and method which uses such a multi-beam scanning device is provided.

17 Claims, 3 Drawing Sheets

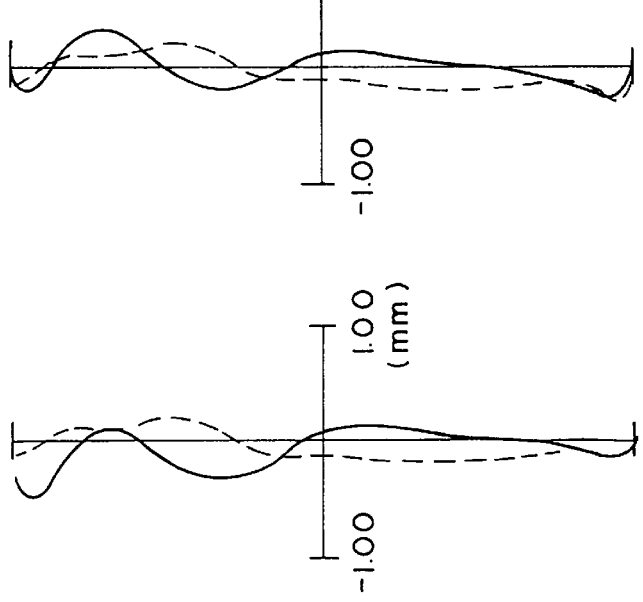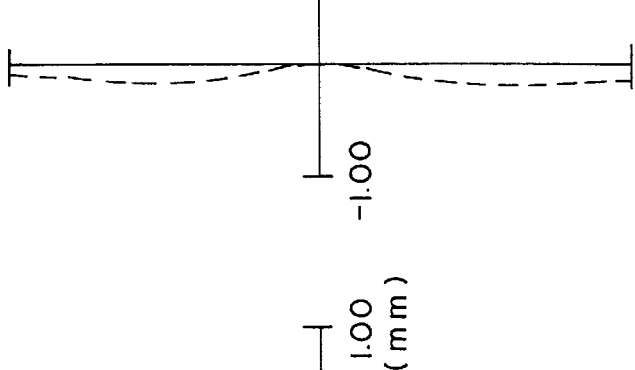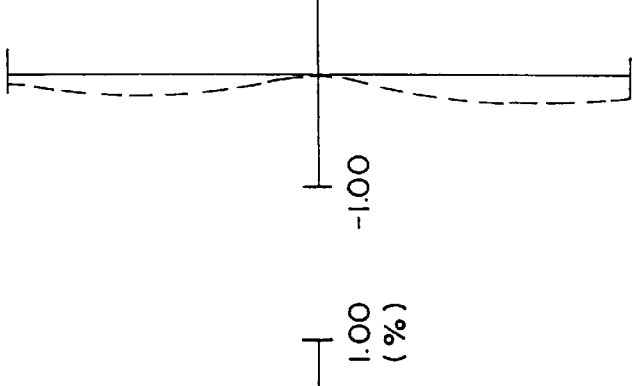

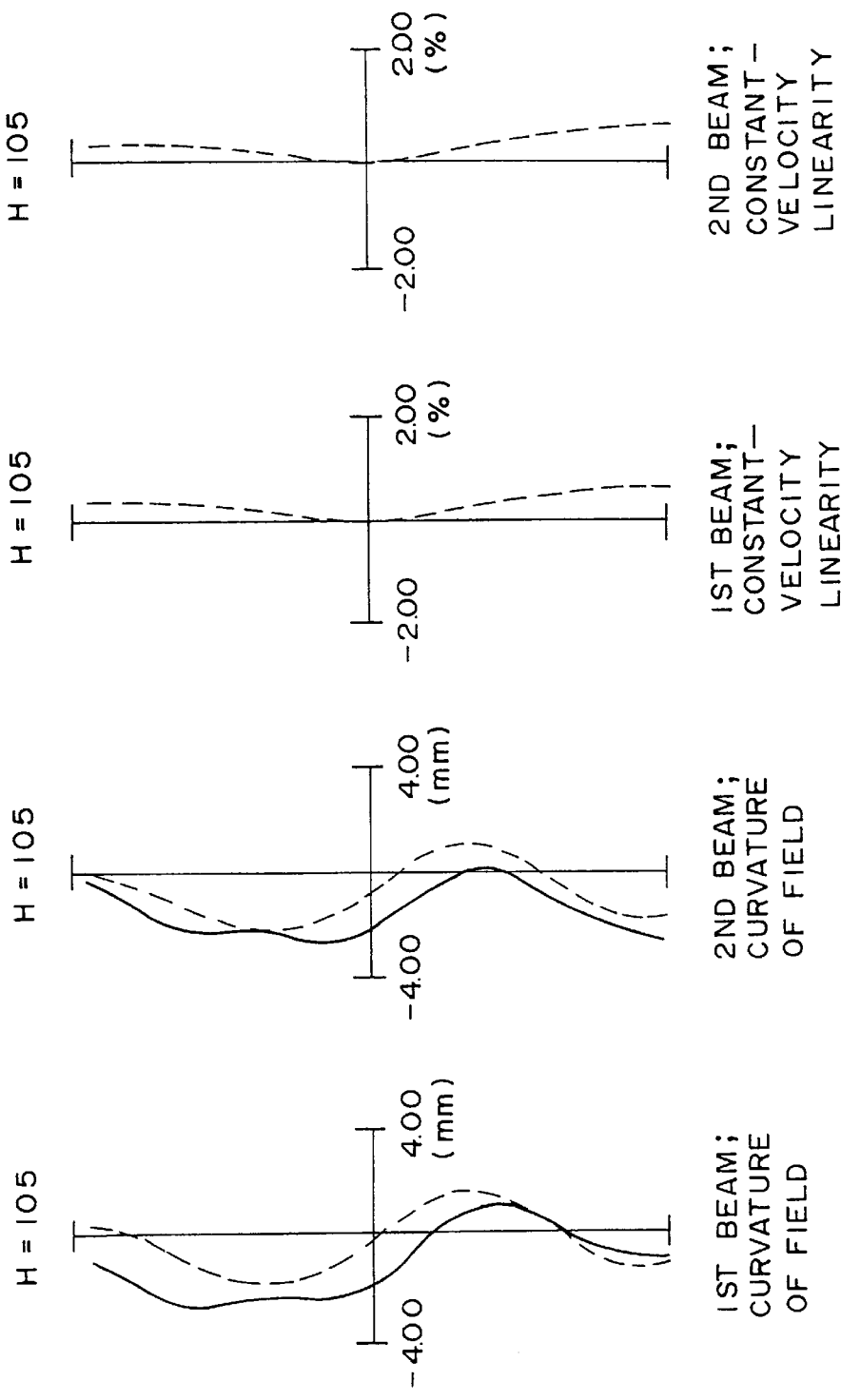

MULTI-BEAM SCANNING DEVICE AND IMAGE FORMING SYSTEM AND METHOD USING THE SAME

The present invention relates to a coated web printing paper suitable for printing with cold-set offset printing ink.

Such a paper is already known from EP-A 0 785 307. As regards the need for enhanced cold-set paper qualities and the related problems, the introductory statements n this older document are referred to.

The web printing paper described in EP-A 0 785 307 is a so-called mat quality. It is explained in detail in this older document that to achieve the pressability and printability of a coated web printing paper in the cold-set offset process, special demands must be made on the paper regarding its wetting/water penetration behavior and its ink absorption speed. These are properties which at times are in turn considerably disadvantaged by a glazing on smoothnesses of 1,000 to 1,600 sec. Bekk, as is necessary for producing typical smooth papers. For this reason, it was first managed to provide a coated mat quality for the cold-set process.

Now that a high degree of advertizing effectiveness is to be achieved via newspaper supplements, only glossy paper can be considered for certain advertizing orders. In the absence of cold-set-suitable glossy LWC papers, these brochures are still printed via the conventional heat-set process as before. To enable the cold-set printer to take on such printing orders as well, the main point was to develop a glossy paper quality that closes this quality gap and can be pressed and printed without problems via the printing machine configurations that are typical in the newspaper printing domain (eight-tower and satellite printing machines). After such a quality has established itself in the domain of mass-produced printing paper, economic aspects are also to be taken into consideration.

As disclosed in Japanese Laid-Open Patent Application No. 8-304722, a conventional multi-beam scanning device utilizes a polarization beam splitter and two light sources in order to achieve the multi-beam scanning. In this conventional device, the polarization beam splitter is used to convert the multiple beams from the light sources into the converging beams incident to a rotary polygonal mirror. However, the polarization beam splitter is expensive, and it is difficult to manufacture and provide this conventional multi-beam scanning device for low cost.

Further, Japanese Laid-Open Patent Application No. 9-146024 discloses a multi-beam scanning device which is configured to perform multi-beam scanning using two light sources while eliminating the need for the expensive polarization beam splitter.

In this conventional multi-beam scanning device, the multiple beams from the light sources are converted into the converting beams, and the converging beams are directly incident to a rotary deflector. The converging beams incident to the deflector form a difference angle between them within a plane that is perpendicular to the rotation axis of the deflector. This conventional multi-beam scanning device includes a lens holder made of aluminum on which the two light sources are firmly mounted. The deviation of the relative positions of the optical axes of the multiple beams from the light sources due to heat or the use over an extended period of time can be prevented.

However, in this conventional multi-beam scanning device, different amounts of sag of the multiple beams are produced when beams are deflected on the reflection surface of the rotary deflector which is rotated about a fixed rotation axis. In order to achieve excellent optical characteristics (beam spot size, beam pitch, etc.) of the multi-beam scanning, the difference in the amounts of sag of the multiple beams must be taken into consideration. This conventional multi-beam scanning device does not take account of this problem, and thus, it is difficult to achieve excellent optical characteristics of the multi-beam scanning.

Further, in this conventional multi-beam scanning device, a cylindrical lens (or a concave cylindrical mirror) is provided to convert the multiple beams in common, and variations of the beam pitch on the image surface due to a tilt error of the cylindrical lens mounted is significant. This conventional multi-beam scanning device does not take account of this problem, and therefore, it is difficult to achieve excellent optical characteristics of the multi-beam scanning.

SUMMARY OF THE INVENTION

To overcome the problems described above, preferred embodiments of the present invention provide an improved multi-beam scanning device which has a simple configuration that can be manufactured and provided at low cost and achieves excellent optical characteristics, such as beam spot size or beam pitch, of multi-beam scanning using a plurality of light sources, while also eliminating the need for a polarization beam splitter.

Also, preferred embodiments of the present invention provide an image forming system which includes a multi-beam scanning device which has a simple configuration that can be manufactured and provided at low cost and achieves excellent optical characteristics, such as beam spot size or beam pitch, of multi-beam scanning using a plurality of light sources, while also eliminating the need for a polarization beam splitter.

A further preferred embodiment of the present invention provides an image forming method which uses a multi-beam scanning device having a simple configuration that can be manufactured and provided at low cost and achieves excellent optical characteristics, such as beam spot size or beam pitch, of multi-beam scanning using a plurality of light sources, while also eliminating the need for a polarization beam splitter.

According to one specific preferred embodiment of the present invention, the multi-beam scanning device includes a plurality of light sources which emit multiple beams, the plurality of light sources including a first light source which emits a first beam, and a second light source which emits a second beam; a plurality of coupling lenses which couple the multiple beams from the light sources, the plurality of coupling lenses including a first coupling lens which couples the first beam, and a second coupling lens which couples the second beam; a converging lens device which converts the coupled beams from the coupling lenses into converging beams, the converging beams being elongated in a direction corresponding to a main scanning direction and converging only in a direction corresponding to a sub-scanning direction that is substantially perpendicular to the main scanning direction, the converging beams which correspond to the first and second beams forming a difference angle that is largest among difference angles formed by all of the converging beams; a rotary deflector having a reflection surface which is rotated about a fixed rotation axis, the reflection surface deflecting the converging beams from the converging lens device while the reflection surface is rotated; and a scanning lens device which scans an image surface in the main scanning direction at a substantially uniform velocity by focusing each of the deflected beams from the rotary deflector into a beam spot on the image surface, wherein the multi-beam scanning device is configured to satisfy the conditions: (1) $\theta^2\beta^2 \cdot A/L < 0.0005$; and (2) $\theta > \tan^{-1}[(\emptyset1+\emptyset2)/2L1]$, where A is a constant distance between the reflection surface and the rotation axis, $\theta$ is the largest difference angle measured in terms of radians, $\emptyset1$ is an effective diameter of the first coupling lens through which the first beam passes, $\emptyset2$ is an effective diameter of the second coupling lens through which the second beam passes, $\beta$ is a transverse magnification of the scanning lens device in the sub-scanning direction, L1 is the smaller one of a distance from the first coupling lens to the reflection surface and a distance from the second coupling lens to the reflection surface, and L is a distance from the reflection surface to the image surface.

According to another preferred embodiment of the present invention, a multi-beam scanning device includes a plurality of light sources which emit multiple beams, the plurality of light sources including a first light source which emits a first beam, and a second light source which emits a second beam; a plurality of coupling lenses which couple the multiple beams from the light sources, the plurality of coupling lenses including a first coupling lens which couples the first beam, and a second coupling lens which couples the second beam; a converging lens device which converts the coupled beams from the coupling lenses into converging beams, the converging beams being elongated in a direction corresponding to a main scanning direction and converging only in a direction corresponding to a sub-scanning direction that is substantially perpendicular to the main scanning direction, the converging lens device including a substantially cylindrical lens, the converging beams which correspond to the first and second beams forming a difference angle that is largest among difference angles formed by all of the converging beams; a rotary deflector having a reflection surface which is rotated about a fixed rotation axis, the reflection surface deflecting the converging beams from the cylindrical lens while the reflection surface is rotated, the reflection surface spaced at a constant distance from the rotation axis; and a scanning lens device which scans an image surface in the main scanning direction at a substantially uniform velocity by focusing each of the deflected beams from the rotary deflector into a beam spot on the image surface, wherein the multi-beam scanning device is configured to satisfy the conditions: (2) $\theta > \tan^{-1}[(\emptyset1+\emptyset2)/2L1]$; and (3) $L2 \cdot \theta \cdot |\beta|/L1 < 0.03$, where $\theta$ is the largest difference angle measured in terms of radians, $\emptyset1$ is an effective diameter of the first coupling lens through which the first beam passes, $\emptyset2$ is an effective diameter of the second coupling lens through which the second beam passes, $\beta$ is a transverse magnification of the scanning lens device in the sub-scanning direction, L1 is the smaller one of a first distance between the first coupling lens and the reflection surface and a second distance between the second coupling lens and the reflection surface; and L2 is a distance between the cylindrical lens and the reflection surface.

According to yet another preferred embodiment of the present invention, an image forming system includes a multi-beam scanning device, and a photoconductive medium having an image surface, wherein the photoconductive medium is electrostatically charged, an electrostatic image is formed on the photoconductive medium when subjected to an optical scanning by the multi-beam scanning device, and the electrostatic image is transformed into a viewable image by development of the electrostatic image using a toner, wherein the multi-beam scanning device includes a plurality of light sources which emit multiple beams, the plurality of light sources including a first light source which emits a first beam, and a second light source which emits a second beam; a plurality of coupling lenses which couple the multiple beams from the light sources, the plurality of coupling lenses including a first coupling lens which couples the first beam, and a second coupling lens which couples the second beam; a converging lens device which converts the coupled beams from the coupling lenses into converging beams, the converging beams being elongated in a direction corresponding to a main scanning direction and converging only in a direction corresponding to a sub-scanning direction that is substantially perpendicular to the main scanning direction, the converging beams which correspond to the first and second beams forming a difference angle that is largest among difference angles formed by all of the converging beams; a rotary deflector having a reflection surface which is rotated about a fixed rotation axis, the reflection surface deflecting the converging beams from the converging lens device while the reflection surface is rotated; and a scanning lens device which scans the image surface of the photoconductive medium in the main scanning direction at a substantially uniform velocity by focusing each of the deflected beams from the rotary deflector into a beam spot on the image surface, the multi-beam scanning device being configured to satisfy the conditions: (1) $\theta^2\beta^2 \cdot A/L < 0.0005$; and (2) $\theta > \tan^{-1}[(\emptyset1+\emptyset2)/2L1]$, where A is a constant distance between the reflection surface and the rotation axis, $\theta$ is the largest difference angle measured in terms of radians, $\emptyset1$ is an effective diameter of the first coupling lens through which the first beam passes, $\emptyset2$ is an effective diameter of the second coupling lens through which the second beam passes, $\beta$ is a transverse magnification of the scanning lens device in the sub-scanning direction, L1 is the smaller one of a first distance between the first coupling lens and the reflection surface and a second distance between the second coupling lens and the reflection surface, and L is a distance between the reflection surface and the image surface.

Another preferred embodiment of the present invention provides a method of forming an image on an image surface of a photoconductive medium in an image forming system, including the steps of providing a multi-beam scanning device which includes a plurality of light sources which emit multiple beams, the plurality of light sources including a first light source which emits a first beam, and a second light source which emits a second beam; a plurality of coupling lenses which couple the multiple beams from the light sources, the plurality of coupling lenses including a first coupling lens which couples the first beam, and a second coupling lens which couples the second beam; a converging lens device which converts the coupled beams from the coupling lenses into converging beams, the converging beams being elongated in a direction corresponding to a main scanning direction and converging only in a direction corresponding to a sub-scanning direction that is substantially perpendicular to the main scanning direction, the converging beams which correspond to the first and second beams forming a difference angle that is largest among difference angles formed by all of the converging beams; a rotary deflector having a reflection surface which is rotated about a fixed rotation axis, the reflection surface deflecting the converging beams from the converging lens device while the reflection surface is rotated; and a scanning lens device which scans the image surface of the photoconductive medium in the main scanning direction at a substantially uniform velocity by focusing each of the deflected beams from the rotary deflector into a beam spot on the image surface, the multi-beam scanning device being configured to satisfy the conditions (1) $\theta^2\beta^2 \cdot A/L < 0.0005$; and (2) $\theta > \tan^{-1}[(\emptyset 1 + \emptyset 2)/2L1]$, where A is a constant distance between the reflection surface and the rotation axis, $\theta$ is the largest difference angle measured in terms of radians, $\emptyset$ is an effective diameter of the first coupling lens through which the first beam passes, $\emptyset$ is an effective diameter of the second coupling lens through which the second beam passes, $\beta$ is a transverse magnification of the scanning lens device in the sub-scanning direction, L1 is the smaller one of a first distance between the first coupling lens and the reflection surface and a second distance between the second coupling lens and the reflection surface; and L is a distance between the reflection surface and the image surface; and forming an electrostatic image on the image surface of the photoconductive medium by subjecting the photoconductive medium to a multi-beam scanning of said multi-beam scanning device, in order to transform the electrostatic image into a viewable image by development of the electrostatic image using a toner.

The multi-beam scanning device of preferred embodiments of the present invention does not use an expensive polarization beam splitter and has a simple configuration that can be constructed and provided at low cost. The multi-beam scanning device of preferred embodiments of the present invention is configured to satisfy the conditions (1) and (2) or the conditions (2) and (3) above, which allows the multi-beam scanning device to achieve excellent optical characteristics, such as beam spot size or beam pitch, without using a polarization beam splitter. The multi-beam scanning device of preferred embodiments of the present invention is effective in increasing the scanning speed with a low cost device while achieving the excellent optical characteristics.

Further, an image forming system and method which uses the multi-beam scanning device of various preferred embodiments of the present invention is provided. The image forming system and method of additional preferred embodiments of the present invention is highly effective in increasing the scanning speed at low cost while achieving excellent optical characteristics.

BRIEF DESCRIPTION OF THE DRAWINGS

Other objects, features and advantages of the present invention will become more apparent from the following detailed description of preferred embodiments when read in conjunction with the accompanying drawings in which:

FIG. 2A and FIG. 2B are diagrams for explaining field-curvature characteristics of first and second beams in Example 1 of the multi-beam scanning device of preferred embodiments of the present invention;

FIG. 2C and FIG. 2D are diagrams for explaining constant-velocity linearities of the first and second beams in Example 1 of the multi-beam scanning device of preferred embodiments of the present invention;

FIG. 3A and FIG. 3B are diagrams for explaining field-curvature characteristics of first and second beams in Example 2 of the multi-beam scanning device of preferred embodiments of the present invention; and FIG. 3C and FIG. 3D are diagrams for explaining constant-velocity linearities of the first and second beams in Example 2 of the multi-beam scanning device of preferred embodiments of the present invention.

DETAILED DESCRIPTION OF PREFERRED EMBODIMENTS

Figure 1:
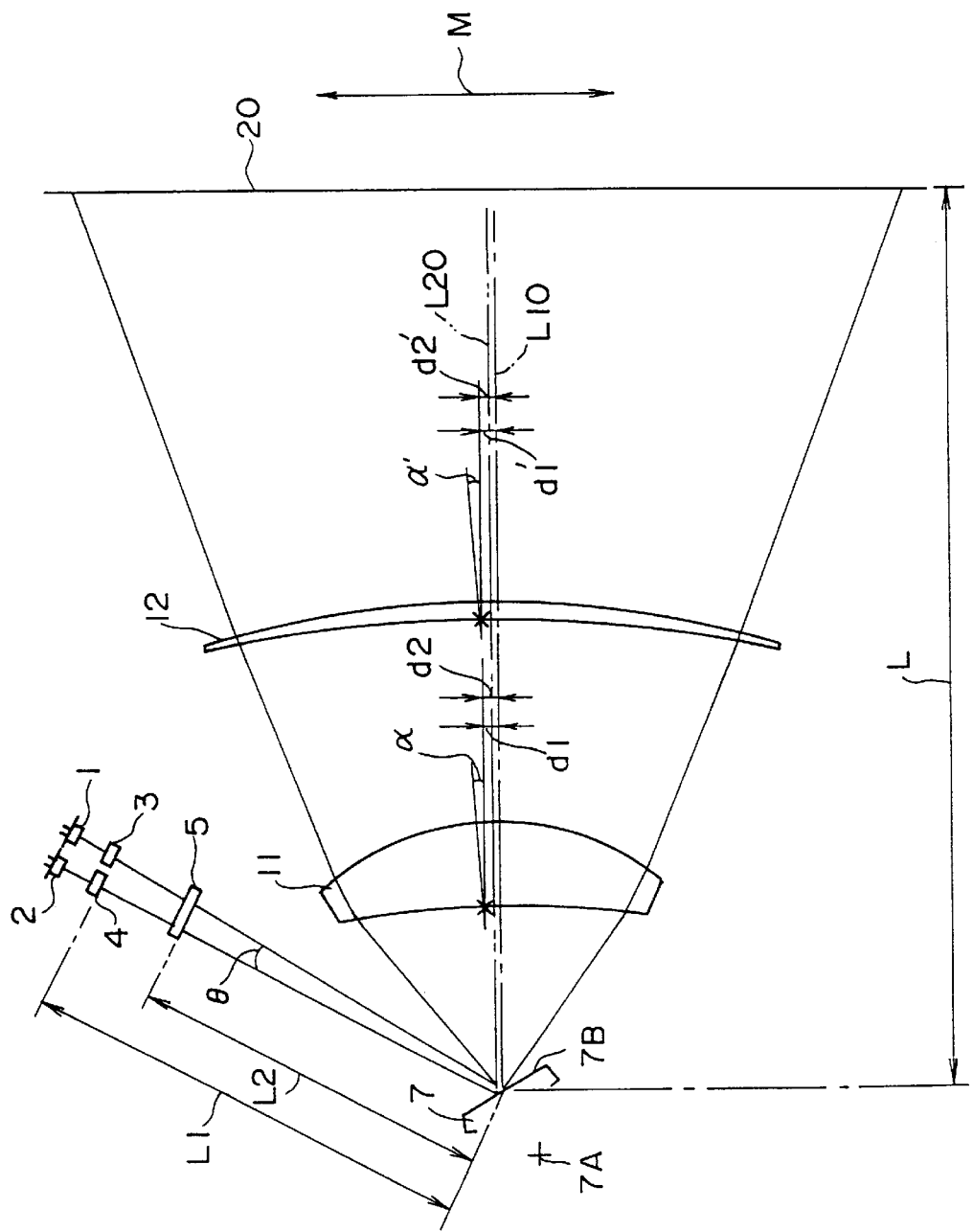
FIG. 1 is a diagram which illustrates a preferred embodiment of the multi-beam scanning device of the present invention.

A description will now be provided of the preferred embodiments of the present invention with reference to the accompanying drawings.

FIG. 1 shows a preferred embodiment of the multi-beam scanning device of the present invention.

As shown in FIG. 1, the multi-beam scanning device according to the present preferred embodiment includes a plurality of light sources which emit multiple beams. In the present preferred embodiment, the plurality of light sources preferably include a first laser diode (LD) 1 which emits a first laser beam, and a second laser diode (LD) 2 which emits a second laser beam, although other light sources may be used. The first and second laser diodes 1 and 2 are operated to emit the first and second laser beams independently of each other.

The multi-beam scanning device of FIG. 1 includes a plurality of coupling lenses which couple the multiple beams emitted by the plurality of light sources. In the present preferred embodiment, the plurality of coupling lenses preferably include a first coupling lens 3 and a second coupling lens 4, although other coupling lens configurations may be used. The first coupling lens 3 couples the first laser beam from the first LD 1, and the second coupling lens 4 couples the second laser beam from the second LD 2.

The number of coupling lenses provided in the multi-beam scanning device of various preferred embodiments of the present invention may be equal to or smaller than the number of light sources provided therein. One of the plurality of coupling lenses may collimate two or more beams from the plurality of light sources in a shared manner. The collimated beams passing through the coupling lenses may become parallel, may become slightly convergent, or may become slightly divergent.

The multi-beam scanning device of FIG. 1 also preferably includes a converging lens device 5 which converts the coupled beams from the coupling lenses 3 and 4 into converging beams. In the present preferred embodiment, the converging lens device 5 preferably includes a substantially cylindrical lens. Alternatively, a concave cylindrical mirror may be used as the converging lens device. The converging beams from the converging lens device 5 are elongated in a direction corresponding to a main scanning direction (which is indicated by the arrows M in FIG. 1) on an image surface 20, and they are converging only in a direction corresponding to a sub-scanning direction (which is normal to the paper of FIG. 1) perpendicular to the main scanning direction M. The converging beams, which correspond to the first and second laser beams from the laser diodes 1 and 2, form a difference angle $\theta$ that is largest among the difference angles formed by all the converging beams.

The multi-beam scanning device of FIG. 1 includes a rotary deflector 7 having a reflection surface 7B which is rotated about a fixed rotation axis 7A. In the present preferred embodiment, the rotary deflector 7 preferably includes a rotary polygonal deflector. Alternatively, a rotary two-surface mirror deflector or a rotary one-surface mirror deflector may be used as the rotary deflector 7. The reflection surface 7B deflects the converging beams from the converging lens device 5 while the reflection surface 7B is rotated about the rotation axis 7A at a substantially uniform velocity. The reflection surface 7B is spaced from the rotation axis 7B at a constant distance A.

The multi-beam scanning device of FIG. 1 includes a scanning lens device (e.g., the elements 11 and 12 in FIG. 1)

which scans the image surface 20 in the main scanning-direction M at a generally uniform velocity by simultaneously focusing each of the deflected beams from the rotary deflector 7 into a beam spot on the image surface 20. The beam spots on the image surface 20 created from the multiple beams are spaced from each other in the sub-scanning direction at desired small intervals (or the beam pitch). Hence, the image surface 20 is scanned by the multi-beam scanning device of FIG. 1 along two or more scanning lines in the main scanning direction M by using the multiple beams simultaneously.

The multi-beam scanning device of the present preferred embodiment does not use an expensive polarization beam splitter, and it is effective in increasing the scanning speed at low cost. In the multi-beam scanning device of FIG. 1, the scanning lens device preferably includes a scanning lens element 11 and a scanning lens element 12, which will be explained later. Alternatively, the scanning lens may be constituted by either a single scanning lens element or three or more scanning lens elements.

In an electrophotographic image forming system which uses the multi-beam scanning device of the above-described present preferred embodiment, the image surface 20 is constituted by a surface of a photoconductive medium. The photoconductive medium preferably includes a cylindrical drum or an endless belt within the image forming system. The image surface 20 of the photoconductive medium is moved at a rate synchronized with the rotation of the rotary deflector 7, in a direction corresponding to the sub-scanning direction. In the image forming system, the photoconductive medium is electrostatically charged. When the image surface 20 is subjected to the multi-beam scanning by the multi-beam scanning device of FIG. 1, an electrostatic image is formed on the photoconductive medium. The electrostatic image is transformed into a viewable image by a development of the electrostatic image using electrostatically-charged toner particles. The toned image is electrostatically transferred from the photoconductive medium to a recording sheet (usually, paper or plastic sheet). The toner is thermally fused to the recording sheet. Hence, the image is finally formed on the recording sheet by the image forming system.

The multi-beam scanning device of FIG. 1 is preferably configured to satisfy the conditions:

$$\theta^2 \beta^2 \cdot A/L < 0.0005 \tag{1}$$

$$\theta > \tan^{-1}[(\emptyset 1 + \emptyset 2)/2L1] \tag{2}$$

where A is a constant distance between the reflection surface 7B and the rotation axis 7A, $\theta$ is the largest difference angle of the multiple beams measured in terms of radians, $\emptyset 1$ is an effective diameter of the first coupling lens 3 through which the first laser beam passes, $\emptyset 2$ is an effective diameter of the second coupling lens 4 through which the second laser beam passes, $\beta$ is a transverse magnification of the scanning lens elements 11 and 12 in the sub-scanning direction, L1 is the smaller one of a distance from the first coupling lens 3 to the reflection surface 7B and a distance from the second coupling lens 4 to the reflection surface 7B; and L is a distance from the reflection surface 7B to the image surface 20.

When condition (1) is satisfied, the multi-beam scanning device of FIG. 1 significantly minimizes the difference of the amounts of sag of the multiple beams to an excellent level and achieves excellent field-curvature characteristics and excellent constant-velocity linearities. When condition (2) is satisfied, the multi-beam scanning device of FIG. 1 achieves excellent characteristics, such as beam spot size or beam pitch, of multi-beam scanning without using a polarization beam splitter.

Further, the multi-beam, scanning device of FIG. 1 includes the converging lens device 5 which preferably includes a cylindrical lens. The multi-beam scanning device of FIG. 1 may be configured to satisfy the conditions:

$$\theta > \tan^{-1}[(\emptyset 1 + \emptyset 2)/2L1] \tag{2}$$

$$L2 \cdot |\beta|/L1 < 0.03 \tag{3}$$

where $\theta$ is the largest difference angle of the multiple beams measured in terms of radians, $\emptyset 1$ is an effective diameter of the first coupling lens 3 through which the first laser beam passes, $\emptyset 2$ is an effective diameter of the second coupling lens 4 through which the second laser beam passes, $\beta$ is a transverse magnification of the scanning lens device in the sub-scanning direction, L1 is the smaller one of a distance between the first coupling lens 3 and the reflection surface 7B and a distance between the second coupling lens 3 and the reflection surface 7B, and L2 is a distance between the cylindrical lens 5 and the reflection surface 7B.

When condition (2) is satisfied, the multi-beam scanning device of FIG. 1 achieves excellent optical characteristics, such as beam spot size or beam pitch, of the multi-beam scanning without using a polarization beam splitter. When condition (3) is satisfied, the multi-beam scanning device of FIG. 1 minimizes the variations of the beam pitch on the image surface 20, due to a tilt error of the cylindrical lens 5, to an excellent level and achieves excellent optical characteristics of the multiple beams.

In order to satisfy conditions (2) and (3), it is preferable that the distance L1 is set to an adequately large value. For example, a reflecting mirror may be placed between the coupling lenses and the cylindrical lens 5 in the preferred embodiment of FIG. 1 to ensure an adequately large distance L1.

Further, when first image points corresponding to outermost peripheries of one of the multiple beams are located at positions S1(+) and S1(−) on the image surface 20 with respect to the sub-scanning direction and second image points corresponding to outermost peripheries of a different one of the multiple beams are located at positions S2(+) and S2(−) on the image surface 20 with respect to the sub-scanning direction, the multi-beam scanning device of FIG. 1 is preferably configured to satisfy the condition:

$$(S1(+)-S1(-)) \cdot (S2(+)-S2(-)) < 0. \tag{4}$$

Further, when first image points corresponding to outermost peripheries of one of the multiple beams are located at positions M1(+) and M1(−) on the image surface 20 with respect to the main scanning direction and second image points corresponding to outermost peripheries of a different one of the multiple beams lie at positions M2(+) and M2(−) on the image surface 20 with respect to the main scanning direction, the multi-beam scanning device of FIG. 1 is preferably configured to satisfy the condition:

$$(M1(+)-M1(-)) \cdot (M2(+)-M2(-))0. \tag{5}$$

When condition (4) and/or condition (5) are satisfied, the multi-beam scanning device of FIG. 1 has a simple configuration constructed and provided at low cost and achieves excellent field-curvature characteristics of the multi-beam scanning.

Further, the multi-beam scanning device of FIG. 1 may be configured such that the scanning lens device includes at least one scanning lens element which is shifted and/or tilted within a scanning plane that is substantially perpendicular to the rotation axis 7A. When the above-noted requirement is satisfied, the multi-beam scanning device of FIG. 1 minimizes the difference of the amounts of sag of the multiple beams to an excellent level.

Next, a detailed description will be given of Examples 1 and 2 of the multi-beam scanning device of preferred embodiments of the present invention.

For the sake of convenience of description, suppose now that the scanning lens device (or the scanning lens elements 11 and 12) is omitted from the multi-beam scanning device of FIG. 1. As the first laser beam (one of the multiple beams) is deflected by the reflection surface 7B of the rotary deflector 7, it can be assumed that the deflected beam constitutes a first reference line L10 (indicates by the one-dot chain line in FIG. 1) which is normal to the image surface 20. Similarly, as the second laser beam (one of the multiple beams) is deflected, it can be assumed that the deflected beam constitutes a second reference line L20 (indicated by the two-dot chain line in FIG. 1) which is normal to the image surface 20.

EXAMPLE 1

The multi-beam scanning device of Example 1 is configured in the same manner as the preferred embodiment of FIG. 1. In Example 1, the angle between the first laser beam from the LD 1 and the first reference line L10 is equal to about 60°, and the angle between the second laser beam from the LD 2 and the second reference line L20 is equal to about 63.6°. Hence, the largest difference angle θ of the multiple beams (or the difference angle of the first and second laser beams) is equal to about 3.6° (that is, about 0.0628 radians).

In Example 1, the coupled beams (the first and second laser beams) passing through the coupling lenses 3 and 4 are slightly convergent beams. Supposing that the coupled beams are deflected by the rotary deflector 7 without being influenced by the other optical elements of the multi-beam scanning device, the distance of a natural convergence point of the first and second laser beams from the reflection surface 7B along the reference lines L10 and L20 is set to about 1860 mm.

In Example 1, the rotary deflector 7 is constituted by a rotary polygonal deflector, and the constant distance between the reflection surface 7B and the rotation axis 7A is set to about 18 mm. That is, A=18 mm. When the first laser beam is deflected by the rotary deflector 7, the incident angle of the first laser beam to the reflection surface 7B is set to about 30°. When the second laser beam is deflected by the rotary deflector 7, the incident angle of the second laser beam to the reflection surface 7B is set to about 31.8°.

In Example 1, the converging lens device 5 is constituted by a cylindrical lens. The cylindrical lens 5 has a first surface on the incoming side of the laser beam and a second surface on the outgoing side of the laser beam. The first surface of the cylindrical lens 5 is a convex cylindrical surface having a positive power only with respect to the direction corresponding to the sub-scanning direction. The first surface of the cylindrical lens 5 has a radius of curvature of about 24 mm. The second surface of the cylindrical lens 5 is a flat surface. The thickness at the center of the cylindrical lens 5 is equal to about 3 mm. The refractive index of the cylindrical lens 5 when the laser beam of a predetermined wavelength is used is equal to about 1.51375.

The distance L2 from the cylindrical lens 5 to the reflection surface 7B with respect to the first laser beam is equal to about 43.6 mm when a deflection line of the first laser beam deflected by the reflection surface 7B of the rotary deflector 7 corresponds with the first reference line L10.

The distance L2 from the cylindrical lens 5 to the reflection surface 7B with respect to the second laser beam is equal to about 43.6 mm when a deflection line of the second laser beam deflected by the reflection surface 7B of the rotary deflector 7 corresponds with the second reference line L20.

The optical axis of the cylindrical lens 5 within the plane perpendicular to the rotation axis 7A of the rotary deflector 7 of FIG. 1 is at angles of about 1.8° relative to each of the directions of the first and second laser beams incident to the reflection surface 7B of the rotary deflector 7. The cylindrical lens 5 converts the coupled beams (the first and second laser beams) from the coupling lenses 3 and 4 into the converging beams in a shared manner. The first laser beam and the second laser beam both incident to the reflection surface 7B are at angles of about 1.8° relative to the optical axis of the cylindrical lens 5 within the plane perpendicular to the rotation axis 7A.

In Example 1, the scanning lens device is preferably constituted by the scanning lens element 11 and the scanning lens element 12. The scanning lens element 11 includes a first surface on the incoming side of the laser beam and a second surface on the outgoing side of the laser beam. The first surface of the scanning lens element 11 is an aspherical surface which is defined in accordance with the equation:

$$X = r^2/[R1 + R1 \cdot \sqrt{1-(1+K1)r^2/R1^2}] + R1A4 \cdot r^4 + R1A6 \cdot r^6 + \quad (A)$$

where X is a coordinate of the point on the first surface in a direction that is substantially parallel to the optical axis of the lens element, r is a distance from the vertex of the lens element in a direction that is substantially perpendicular to the optical axis of the lens element, R1 is a radius of curvature of the first surface paraxial to the optical axis of the lens element, K1 is a "conical" coefficient, and R1A4, R1A6, R1A8, . . . are high-order coefficients.

As for the first surface of the scanning lens element 11 of Example 1, the aspherical surface is defined in accordance with equation (A) and specific values of the coefficients of the aspherical surface are as follows:

| | |
|---|---|
| R1 | −174.41 |
| K1 | −4.30 |
| R1A4 | 1.410E-08 |
| R1A6 | −3.060E-11 |
| R1A8 | −2.700E-13 |
| R1A10 | 4.737E-17 |
| R1A12 | 6.560E-21 |

Specific values of the coefficients related to this aspherical surface (and also specific values of the coefficients related to subsequent aspherical surfaces) are given in millimeters and indicated by using a scientific notation. For example, the scientific notation "1.410E-08" represents the product of the decimal fractional number 1.410 and $10^{-8}$.

The thickness at the center of the scanning lens element 11 in Example 1 is equal to about 22.0 mm. The refractive index of the scanning lens element 11 when the laser beam of the predetermined wavelength is used is equal to about 1.52706.

The second surface of the scanning lens element 11 has a sub-scan cross section (not shown in FIG. 1), parallel to the optical axis of the lens element and to the sub-scanning direction, which is a straight line. The second surface of the scanning lens element 11 has a main-scan cross section (within the scanning plane shown in FIG. 1), including the optical axis and being parallel to the main scanning direction, which has a non-circular arc shape defined in accordance with the equation:

$$X=Y^2/[R+R\cdot\sqrt{1-(1+K)Y^2/R^2}]+A4\cdot Y^4+A6\cdot Y^6+A8\cdot Y^8+ \quad (B)$$

where X is a coordinate of the point on the second surface in a direction that is substantially parallel to the optical axis of the lens element, Y is a distance from the vertex of the lens element in a direction that is substantially perpendicular to the optical axis of the lens element, R is a radius of curvature of the second surface paraxial to the optical axis of the lens element, K is a "conical" coefficient, and A4, A6, A8, . . . are high-order coefficients.

As for the second surface of the scanning lens element 11 of Example 1, the non-circular arc shape in the main-scan cross section is defined in accordance with equation (B), and specific values of the coefficients of the arc shape are given as follows:

| | |
|---|---|
| R | −58.8 |
| K | −0.113 |
| A4 | 4.977E−07 |
| A6 | −5.799E−11 |
| A8 | 1.392E−14 |
| A10 | −4.327E−17 |

Further, in Example 1, the scanning lens element 12 of the scanning lens device includes a first surface on the incoming side of the laser beam and a second surface on the outgoing side of the laser beam. The first surface of the scanning lens element 12 has a radius "rs(Y)" of curvature in a sub-scan cross section (not shown in FIG. 1) which is parallel to the optical axis of the lens element and to the sub-scanning direction. The radius "rs(Y)" of curvature in the sub-scan cross section of the first surface of the scanning lens element 12 is defined in accordance with the equation:

$$rs(Y)=RSO+a1\cdot Y+a2\cdot Y^2+a3\cdot Y^3+a4\cdot Y^4+a5\cdot Y^5+ \quad (C)$$

where Y is a coordinate of the point on the first surface in a direction parallel to the optical axis of the lens element, RSO is a radius of curvature at Y=0, and a1, a2, a3, a4, a5, . . . are coefficients.

The first surface of the scanning lens element 12 has a main-scan cross section (within the scanning plane shown in FIG. 1), including the optical axis of the lens element and being parallel to the main scanning direction, which is a non-circular arc shape defined in accordance with equation (B), and specific values of the coefficients of the non-circular arc shape are as follows:

| | |
|---|---|
| R | −341.72 |
| K | −88.49 |
| A4 | −1.093E−07 |
| A6 | −1.154E−11 |
| A8 | −1.387E−15 |
| A10 | 2.570E−19 |

The first surface of the scanning lens element 12 has the radius of curvature in the sub-scan cross section, which is defined in accordance with equation (C), and specific values of the coefficients of the radius of curvature are as follows:

| | |
|---|---|
| RSO | −37.25 |
| a2 | 2.868E−03 |
| a3 | 1.312E−06 |
| a4 | −9.056E−07 |
| a5 | −2.529E−10 |
| a6 | 1.30 9E−11 |
| a7 | −1.833E−13 |
| a8 | 2.564E−14 |
| a9 | 2 986E−17 |
| a10 | −7.083E−18 |
| a11 | 1.541E−21 |
| a12 | 5.928E−22 |

The thickness at the center of the scanning lens element 12 of this Example is equal to about 3.5 mm. The refractive index N of the scanning lens element 12 when the laser beam of the predetermined wavelength is used is equal to about 1.52706.

The second surface of the scanning lens element 12 has a main-scan cross section (within the scanning plane shown in FIG. 1), including the optical axis of the lens element and being parallel to the main scanning direction, which is a non-circular arc shape defined in accordance with equation (B), and specific values of the coefficients of the non-circular arc shape are as follows:

| | |
|---|---|
| R | −680.32 |
| K | −79.39 |
| A4 | −2.376E−07 |
| A6 | −8.612E−12 |
| A8 | −1.278E−16 |
| A10 | 1.268E−21 |

The second surface of the scanning lens element 12 has a radius of curvature in a sub-scan cross section (not shown in FIG. 1), parallel to the optical axis of the lens element and to the sub-scanning direction. The radius of curvature in the sub-scan cross section of the second surface of the scanning lens element 12 is defined in accordance with equation (C), and specific values of the coefficients of the radius of curvature are as follows:

RSO−16.62 a1=a2=a3=. . . =0.0

In other words, the radius of curvature in the sub-scan cross section of the second surface of the scanning lens element 12 is constant regardless of the position of the sub-scan cross section.

In Example 1, the distance between the reflection point of the reflection surface 7B and the first surface of the scanning lens element 11 along the first reference line L10 is equal to about 45.6 mm. The distance between the second surface of the scanning lens element 11 and the first surface of the scanning lens element 12 along the first reference line L10 is equal to about 51.5 mm. The distance between the second surface of the scanning lens element 12 and the image surface 20 along the first reference line L10 is equal to about 106.9 mm. The distance L between the reflection point of the reflection surface 7B and the image surface 20 along the first reference line L10 is equal to about 229.5 mm.

As shown in FIG. 1, "d1" is a distance from the vertex of the first surface of the scanning lens element 11 to the first reference line L10, "d2" is a distance from the vertex of the first surface of the scanning lens element 11 to the second reference line. In Example 1, the scanning lens elements 11 and 12 are shifted to the upper side of the reference lines L10 and L20 within the scanning plane that is substantially perpendicular to the rotation axis 7A, as follows:

d1 0.80 mm, d2=0.84 mm, d1' 0.71 mm, d2'=0.75 mm.

Further, in Example 1, the scanning lens elements 11 and 12 are tilted within the scanning plane that is substantially perpendicular to the rotation axis 7A. A tilt angle to "α" of the scanning lens element 11 relative to the first reference line L10 (or the second reference line L20) within the scanning plane is equal to about −0.04°. A tilt angle "α'" of the scanning lens element 12 relative to the first reference line L10 (or the second reference line L20) within the scanning plate is equal to about −0.17°. The counterclockwise direction of the rotation around the vertex of each lens element is considered the positive direction of these tilt angles.

In Example 1, the difference angle θ of the converging beams (the first and second laser beams) is equal to about −0.0628 radians (=3.6°), and the transverse magnification β of the scanning lens elements 11 and 12 in the sub-scanning direction between the reflection surface 7B and the image surface 20 is equal to about −0.84. As described above, A=18 mm and L=229.5 mm. Therefore, in Example 1, the equation $\theta^2 \beta^2 \cdot A/L = 0.00022$, and the multi-beam scanning device of Example 1 is configured such that Condition (1) is satisfied.

In Example 1, both the distance between the coupling lens 3 and the reflection surface 7B and the distance between the coupling lens 4 and the reflection surface 7B are substantially equal to 140 mm, and L1=140 mm. Both the effective diameter Ø1 of the first coupling lens 3 and the effective diameter Ø2 of the second coupling lens 4 are equal to about 4 mm. Therefore, in Example 1, $\tan^{-1}[(Ø1+Ø2)/2L1]=0.029$ (in radians), and the multi-beam scanning device of Example 1 is configured such that conditions (1) and (2) are satisfied. Accordingly, it is possible for the multi-beam scanning device of Example 1 to greatly reduce the difference of the amounts of sag of the multiple beams to an excellent level and achieve excellent field-curvature characteristics and excellent constant-velocity linearities. It is also possible for the multi-beam scanning device of Example 1 to achieve excellent optical characteristics, such as beam spot size or beam pitch, of the multi-beam scanning without using a polarization beam splitter.

Further, in Example 1, $L2 \cdot \theta |\beta|/L1 = 0.0172$, and the multi-beam scanning device of Example 1 is configured such that Conditions (1) and (2) are satisfied. Accordingly, it is possible for the multi-beam scanning device of Example 1 to achieve excellent optical characteristics of the multi-beam scanning without using a polarization beam splitter. It is also possible for the multi-beam scanning device of Example 1 to minimize the variations of the beam pitch the image surface to an excellent level and achieve excellent optical characteristics of the multiple beams.

When the emission points of the first and second laser diodes 1 and 2 in Example 1 are shifted in the opposite directions corresponding to the sub-scanning direction by about 3.95 μm each relative to the optical axes of the first and second coupling lens 3 and 4, the target pitch between the scanning lines is equal to about 21.2 μm (1200 dpi). In this case, even when the cylindrical lens 5 is tilted by 3° with respect to the optical axis, the variations of the beam pitch achieved in Example 1 are below the level of about ±2 μm. It was thus discovered that the beam pitch achieved by Example 1 is maintained at the excellent level.

Suppose that the distance L2 relative to the cylindrical lens 5 is set to about 117.7 mm and the radius of curvature of the first surface of the cylindrical lens with respect to the sub-scanning direction is set to about 65 mm. When the emission points of the first and second laser diodes 1 and 2 in Example 1 are shifted in the opposite directions corresponding to the sub-scanning direction by about 1.57 μm each relative to the optical axes of the first and second coupling lens 3 and 4, the target pitch between the scanning lines is equal to about 21.2 μm (1200 dpi). In this case, when the cylindrical lens 5 is tilted by 3° with respect to the optical axis, the variations of the beam pitch are about ±5 μm, and $L2 \cdot \theta |\beta|/L1 = 0.044$. It was discovered that, when condition (3) is not met, the beam pitch is not maintained at the excellent level and relatively large variations of the beam pitch may occur.

In Example 1, S1(+)=−0.29, S1(−)=−0.08, S2(+)=−0.01, S2(−)=−0.20, and therefore: (S1(+)−S1(−))·(S2(+)−S2(−))=−0.0399<0.

In Example 1, M1(+)=−0.10, M1(−)=0.00, M2(+)=−0.18, M2(−)=−0.20, and therefore: (M1(+)−M1(−))·(M2(+)−M2(−))=−0.002<0.

The multi-beam scanning device of Example 1 is configured such that conditions (4) and (5) are satisfied. Accordingly, it is possible for the multi-beam scanning device of Example 1 to have a simple configuration with low cost and achieve excellent field-curvature characteristics of the multi-beam scanning.

FIG. 2A and FIG. 2B show field-curvature characteristics of the first and second laser beams in the multi-beam scanning device of Example 1. In FIG. 2A and FIG. 2B, the solid line indicates the field-curvature characteristics of Example 1 with respect to the sub-scanning direction, and the broken line indicates the field-curvature characteristics of Example 1 with respect to the main scanning direction. The image height H is equal to about 108 mm. FIG. 2C and FIG. 2D show constant-velocity linearities of the first and second laser beams in the multi-beam scanning device of Example 1.

It is clear from FIG. 2A through FIG. 2D that both the field-curvature characteristics and the constant-velocity linearities of the first and second laser beams are at excellent levels. It proves that the multi-beam scanning device of Example 1 achieves excellent optical characteristics of the multi-beam scanning.

EXAMPLE 2

In the multi-beam scanning device of Example 2, the scanning lens device is constituted by a single scanning lens element, and the other elements are configured in the same manner as in the preferred embodiment of FIG. 1. In Example 2, the angle between the first laser beam from the LD 1 and the first reference line L10 is equal to about 60°, and the angle between the second laser beam from the LD 2 and the second reference line L20 is equal to about 61.6°. Hence, the largest difference angle θ of the multiple beams (or the difference angle of the first and second laser beams) is equal to about 1.6° (that is, about 0.0279 radians).

In Example 2, the coupled beams (the first and second laser beams) passing through the coupling lenses 3 and 4 are slightly convergent beams. Supposing that the coupled beams are deflected by the rotary deflector 7 without being influenced by the other optical elements of the multi-beam scanning device, the distance of a natural convergence point of the first and second laser beams from the reflection surface 7B along the reference lines L10 and L20 is set to about 1473 mm.

In Example 2, the rotary deflector 7 is constituted by a rotary hexagonal deflector, and the constant distance between the reflection surface 7B and the rotation axis 7A is set to about 18 mm. That is, A=18 mm. When the first laser beam is deflected by the rotary deflector 7, the incident angle of the first laser beam to the reflection surface 7B is set to about 30°. When the second laser beam is deflected by the rotary deflector 7, the incident angle of the second laser beam to the reflection surface 7B is set to about 30.8°.

In Example 2, the converging lens device 5 is constituted by a substantially cylindrical lens. The substantially cylindrical lens 5 has a first surface on the incoming side of the laser beam and a second surface on the outgoing side of the laser beam. The first surface of the cylindrical lens 5 is a convex cylindrical surface having a positive power only with respect to the direction corresponding to the sub-scanning direction. The first surface of the cylindrical lens 5 has a radius of curvature of about 13.9 mm. The second surface of the cylindrical lens 5 is a flat surface. The thickness at the center of the cylindrical lens 5 is equal to about 3 mm. The refractive index of the cylindrical lens 5 when the laser beam of a predetermined wavelength is used is equal to about 1.5244.

The distance L2 from the cylindrical lens 5 to the reflection surface 7B with respect to the first laser beam is equal to about 25.0 mm when a deflection line of the first laser beam deflected by the reflection surface 7B of the rotary deflector 7 corresponds with the first reference line L10.

The distance L2 from the cylindrical lens 5 to the reflection surface 7B with respect to the second laser beam is equal to about 25.0 mm when a deflection line of the second laser beam deflected by the reflection surface 7B of the rotary deflector 7 corresponds with the second reference line L20.

The optical axis of the cylindrical lens 5 within the plane perpendicular to the rotation axis 7A of the rotary deflector 7 is at angles of about 0.8° relative to each of the directions of the first and second laser beams incident to the reflection surface 7B of the rotary deflector 7. The cylindrical lens 5 converts the coupled beams (the first and second laser beams) from the coupling lenses 3 and 4 into the converging beams in a shared manner. The first laser beam and the second laser beam both incident to the reflection surface 7B are at the angles of about 0.8° to the optical axis of the cylindrical lens 5 within the plane perpendicular to the rotation axis 7A.

In Example 2, the scanning lens element (the single lens element of the scanning lens device) includes a first surface on the incoming side of the laser beam and a second surface on the outgoing side of the laser beam. The first surface of the scanning lens element has a main-scan cross section, including the optical axis of the lens element and being parallel to the main scanning direction, which is a non-circular arc shape defined in accordance with equation (B), and specific values of the coefficients of the non-circular arc shape are as follows:

| R | 160.4 |
|---|---|
| K | −59.97 |

-continued

| A4 | −9.465E-07 |
|---|---|
| A6 | 3.847E-10 |
| A8 | −8.113E-14 |
| A10 | 1.000E-17 |

The first surface of the scanning lens element of Example 2 has a radius of curvature in a sub-scan cross section parallel to the optical axis of the lens element and to the sub-scanning direction, which is defined in accordance with equation (C), and specific values of the coefficients of the radius of curvature are as follows:

| RSO | −98.8 |
|---|---|
| a1 | −1.40E-02 |
| a2 | 2.98E-02 |
| a3 | 0.000E-00 |
| a4 | −9.91E-05 |
| a5 | 0.000E-00 |
| a6 | 2.31E-07 |
| a7 | 0.000E-00 |
| a8 | −3.35E-10 |
| a9 | 0.000E-00 |
| a10 | 2.71E-13 |
| a11 | 0.000E-00 |
| a12 | −8.81E-17 |

The thickness at the center of the scanning lens element of Example 2 is equal to about 13.5 mm. The refractive index N of the scanning lens element when the laser beam of the predetermined wavelength is used is equal to about 1.5244.

The second surface of the scanning lens element of Example 2 has a main-scan cross section, including the optical axis of the lens element and being parallel to the main scanning direction, which is a non-circular arc shape defined in accordance with equation (B), and specific values of the coefficients of the non-circular arc shape are as follows:

| R | −141.3 |
|---|---|
| K | −4.7 |
| A4 | −1.02E-06 |
| A6 | 2.44E-10 |
| A8 | −7.86E-14 |
| A10 | 2.80E-17 |

The second surface of the scanning lens element of Example 2 has a radius of curvature in a sub-scan cross section, parallel to the optical axis of the lens element and to the sub-scanning direction, which is defined in accordance with equation (C), and specific values of the coefficients of the radius of curvature are given as follows.

| RSO | −15.25 |
|---|---|
| a1 | 0.000E-00 |
| a2 | −1.92E-03 |

In Example 2, the distance between the reflection point of the reflection surface 7B and the first surface of the scanning lens element along the first reference line L10 is equal to about 33.2 mm. The distance between the first surface of the scanning lens element and the second surface of the scanning lens element along the first reference line L10 (which is the same as the thickness: at the center thereof) is equal to about 13.5 mm. The distance between the second surface of the scanning lens element and the image surface 20 along the first reference line L10 is equal to about 128.3 mm. The distance L between the reflection point of the reflection surface 7B and the image surface 20 along the first reference line L10 is equal to about 175 mm.

In Example 2, the distance "d1" from the vertex of the first surface of the scanning lens element to the first reference line L10 is equal to about 0.40 mm, and the distance "d2" from the vertex of the first surface of the scanning lens element to the second reference line L20 is equal to about 0.40 mm. In Example 2, the scanning lens element is shifted to the upper side of the reference lines L10 and L20 within the scanning plane that is substantially perpendicular to the rotation axis 7A.

Further, in Example 2, the scanning lens element is tilted within the scanning plane that is substantially perpendicular to the rotation axis 7A. A tilt angle "α" of the scanning lens element relative to the first reference line L10 (or the second reference line L20) within the scanning plane is equal to about −0.35°. The counterclockwise direction of the rotation around the vertex of the scanning lens element is considered the positive direction of this tilt angle.

In Example 2, the difference angle θ of the converging beams (the first and second laser beams) is equal to about 0.0279 radians (=1.6°), and the transverse magnification β of the scanning lens element in the sub-scanning direction between the reflection surface 7B and surface 20 is equal to about −.2.3. As described above, A=18 mm and L=175 mm. Therefore, in Example 2, $\theta^2 \beta^2 \cdot A/L = 0.00032$, and the multi-beam scanning device of Example 2 is configured such that Condition (1) is satisfied.

In Example 2, both the distance between the coupling lens 3 and the reflection surface 7B and the distance between the coupling lens 4 and the reflection surface 7B are equal to about 200 mm, and L1=200 mm. Both the effective diameter Ø1 of the first coupling lens 3 and the effective diameter Ø2 of the second coupling lens 4 are equal to about 4 mm. Therefore, in Example 2, $\tan^{-1}[(Ø1+Ø2)/2L1]=0.020$ (in radians), and the multi-beam scanning device of Example 2 is configured such that conditions (1) and (2) are satisfied. Accordingly, it is possible for the multi-beam scanning device of Example 2 to minimize the difference of the amounts of sag of the multiple beams to an excellent level and achieve excellent field-curvature characteristics and excellent constant-velocity linearities. It is possible for the multi-beam scanning device of Example 2 to achieve excellent optical characteristics, such as beam spot size or beam pitch, of the multi-beam scanning, without using a polarization beam splitter.

Further, in Example 2, $L2 \cdot \theta \cdot |\beta|/L1 = 0.0172$, and the multi-beam scanning device of Example 2 is configured such that Conditions (2) and (3) are satisfied. Accordingly, it is possible for the multi-beam scanning device of Example 2 to achieve excellent optical characteristics of the multi-beam scanning without using a polarization beam splitter. It is possible for the multi-beam scanning device of Example 2 to reduce the variations of the beam pitch on the image surface 20 to an excellent level and achieve excellent optical characteristics of the multiple beams.

When the emission points of the first and second laser diodes 1 and 2 in Example 2 are shifted in the opposite directions corresponding to the sub-scanning direction by about 1.10 µm each relative to the optical axes of the first and second coupling lens 3 and 4, the target pitch between the scanning lines is equal to about 21.2 µm (1200 dpi). In this case, even when the cylindrical lens 5 is tilted by 3° with respect to the optical axis, the variations of the beam pitch obtained by Example 2 are below the level of about ±1.7 µm. It was discovered that the beam pitch obtained by Example 2 is maintained at the excellent level.

In Example 2, S1(+)=−1.02, S1(−)=−0.87, S2(+)=−0.19, S2(−)=−2.50, and therefore: (S1(+)−S1(−))·(S2(+)−S2(−))=−0.35<0.

The multi-beam scanning device of Example 2 is configured such that Condition (4) is satisfied. Accordingly, it is possible for the multi-beam scanning device of Example 2 to have a simple configuration with low cost and achieve excellent field-curvature characteristics of the multi-beam scanning.

FIG. 3A and FIG. 3B show field-curvature characteristics of the first and second laser beams in the multi-beam. scanning device of Example 2. In FIG. 3A and FIG. 3B, the solid line indicates the field-curvature characteristics of Example 2 with respect to the sub-scanning direction, and the broken line indicates the field-curvature characteristics of Example 2 with respect to the main scanning direction. The image height H is equal to about 105 mm. FIG. 3C and FIG. 3D show constant-velocity linearities of the first and second laser beams in the multi-beam scanning device of Example 2.

It is clear from FIG. 3A through FIG. 3D that both the field-curvature characteristics and the constant-velocity linearities of the first and second laser beams are at excellent levels. It proves that the multi-beam scanning device of Example 2 achieves excellent optical characteristics of the multi-beam scanning.

The present invention is not limited to the above-described preferred embodiments, and variations and modifications may be made without departing from the scope of the present invention.

Further, the present invention is based on Japanese Priority Patent Application No.11-055331 filed on Mar. 3, 1999, the entire contents of which are hereby incorporated by reference.

What is claimed is:

1. A multi-beam scanning device comprising:

a plurality of light sources which emit multiple beams, the plurality of light sources including a first light source which emits a first beam, and a second light source which emits a second beam;

a plurality of coupling lenses which couple the multiple beams from the light sources, the plurality of coupling lenses including a first coupling lens which couples the first beam, and a second coupling lens which couples the second beam;

a converging lens device which converts the coupled beams from the coupling lenses into converging beams, the converging beams being elongated in a direction corresponding to a main scanning direction and converging only in a direction corresponding to a sub-scanning direction that is substantially perpendicular to the main scanning direction, the converging beams which correspond to the first and second beams forming a difference angle that is largest among difference angles formed by all of the converging beams;

a rotary deflector having a reflection surface which is rotated about a fixed rotation axis, the reflection surface deflecting the converging beams from the converging lens device while the reflection surface is rotated; and a scanning lens device which scans an image surface in the main scanning direction at a substantially uniform velocity by focusing each of the deflected beams from the rotary deflector into a beam spot on the image surface, wherein said multi-beam scanning device is configured to satisfy the conditions:

$$\theta^2 \beta^2 \cdot A/L < 0.0005 \quad (1)$$

$$\theta > \tan^{-1}[(\emptyset 1 + \emptyset 2)/2L1] \quad (2)$$

where A is a constant distance between the reflection surface and the rotation axis, $\theta$ is the largest difference angle measured in terms of radians, $\emptyset 1$ is an effective diameter of the first coupling lens through which the first beam passes, $\emptyset 2$ is an effective diameter of the second coupling lens through which the second beam passes, $\beta$ is a transverse magnification of the scanning lens device in the sub-scanning direction, L1 is the smaller one of a distance from the first coupling lens to the reflection surface and a distance from the second coupling lens to the reflection surface; and L is a distance from the reflection surface to the image surface.

2. The multi-beam scanning device according to claim 1, wherein, when first image points corresponding to outermost peripheries of one of the multiple beams are located at positions S1(+) and S1(−) on the image surface relative to the sub-scanning direction and second image points corresponding to outermost peripheries of a different one of the multiple beams are located at positions S2(+) and S2(−) on the image surface relative to the sub-scanning direction, said positions of said first and second image points satisfy the condition:

$$(S1(+) - S1(-)) \cdot (S2(+) - S2(-)) < 0 \quad (3).$$

3. The multi-beam scanning device according to claim 1, wherein, when first image points corresponding to outermost peripheries of one of the multiple beams are located at positions M1(+) and M1(−) on the image surface relative to the main scanning direction and second image points corresponding to outermost peripheries of a different one of the multiple beams lie at positions M2(+) and M2(−) on the image surface with respect to the main scanning direction, said positions of said first and second image points satisfy the condition:

$$(M1(+) - M1(-)) \cdot (M2(+) - M2(-)) < 0 \quad (4).$$

4. The multi-beam scanning device according to claim 1, wherein the plurality of light sources include the first light source and the second light source.

5. The multi-beam scanning device according to claim 1, wherein the scanning lens device comprises a single scanning lens element.

6. The multi-beam scanning device according to claim 1, wherein the scanning lens device includes at least two scanning lens elements.

7. The multi-beam, scanning device according to claim 1, wherein the scanning lens device includes at least one scanning lens element which is shifted and/or tilted within a scanning plane that is substantially perpendicular to the rotation axis.

8. A multi-beam scanning device comprising:

a plurality of light sources which emit multiple beams, the plurality of light sources including a first light source which emits a first beam, and a second light source which emits a second beam;

a plurality of coupling lenses which couple the multiple beams from the light sources, the plurality of coupling lenses including a first coupling lens which couples the first beam, and a second coupling lens which couples the second beam;

a converging lens device which converts the coupled beams from the coupling lenses into converging beams, the converging beams being elongated in a direction corresponding to a main scanning direction and converging only in a direction corresponding to a sub-scanning direction that is substantially perpendicular to the main scanning direction, the converging lens device including a substantially cylindrical lens, the converging beams which correspond to the first and second beams forming a difference angle that is largest among difference angles formed by all of the converging beams;

a rotary deflector having a reflection surface which is rotated about a fixed rotation axis, the reflection surface deflecting the converging beams from the cylindrical lens while the reflection surface is rotated, the reflection surface spaced at a constant distance from the rotation axis; and a scanning lens device which scans an image surface in the main scanning direction at a substantially uniform velocity by focusing each of the deflected beams from the rotary deflector into a spot on the image surface, wherein said multi-beam scanning device is configured to satisfy the conditions:

$$\theta > \tan^{-1}[(\emptyset 1 + \emptyset 2)/2L1] \quad (1)$$

$$L2 \cdot \theta \cdot |\beta|/L1 < 0.03 \quad (2)$$

where $\theta$ is the largest difference angle measured in terms of radians, $\emptyset 1$ is an effective diameter of the first coupling lens through which the first beam passes, $\emptyset 2$ is an effective diameter of the second coupling lens through which the second beam passes, $\beta$ is a transverse magnification of the scanning lens device in the sub-scanning direction, L1 is the smaller one of a first distance between the first coupling lens and the reflection surface and a second distance between the second coupling lens and the reflection surface; and L2 is a distance between the cylindrical lens and the reflection surface.

9. The multi-beam scanning device according to claim 8, wherein, when first image points corresponding to outermost peripheries of one of the multiple beams are located at positions S1(+) and S1(−) on the image surface relative to the sub-scanning direction and second image points corresponding to outermost peripheries of a different one of the multiple beams are located at positions S2(+) and S2(−) on the image surface relative to the sub-scanning direction, said positions of said first and second image points satisfy the condition:

$$(S1(+) - S1(-)) \cdot (S2(+) - S2(-)) < 0 \quad (3).$$

10. The multi-beam scanning device according to claim 8, wherein, when first image points corresponding to outermost peripheries of one of the multiple beams are located at positions M1(+) and M1(−) on the image surface relative to the main scanning direction and second image points corresponding to outermost peripheries of a different one of the multiple beams lie at positions M2(+) and M2(−) on the image surface with respect to the main scanning direction, said positions of said first and second image points satisfy the condition:

$$(M1(+) - M1(-)) \cdot (M2(+) - M2(-)) < 0 \quad (4).$$

11. The multi-beam scanning device according to claim 8, wherein the plurality of light sources include the first light source and the second light source.

12. The multi-beam scanning device according to claim 8, wherein the scanning lens device comprises a single scanning lens element.

13. The multi-beam scanning device according to claim 8, wherein the scanning lens device includes at least two scanning lens elements.

14. The multi-beam, scanning device according to claim 8, wherein the scanning lens device includes at least one scanning lens element which is shifted and/or tilted within a scanning plane that is substantially perpendicular to the rotation axis.

15. A multi-beam scanning device comprising:
a plurality of light source means for emitting multiple beams, the plurality of light source means including a first light source which emits a first beam, and a second light source which emits a second beam;
a plurality of coupling lens means for collimating the multiple beams from the light source means, the plurality of coupling lens means including a first coupling lens which couples the first beam, and a second coupling lens which couples the second beam;
converging lens means for converting the coupled beams from the coupling lenses into converging beams, the converging beams being elongated in a direction corresponding to a main scanning direction and converging only in a direction corresponding to a sub-scanning direction that is substantially perpendicular to the main scanning direction, the converging beams which correspond to the first and second beams forming a difference angle that is largest among difference angles formed by all of the converging beams;
rotary deflector means having a reflection surface which is rotated about a fixed rotation axis, for deflecting the converging beams from the converging lens means while the reflection surface is rotated; and
scanning lens means for scanning an image surface in the main scanning direction at a substantially uniform velocity by focusing each of the deflected beams from the rotary deflector into a beam spot on the image surface,
wherein said multi-beam scanning device is configured to satisfy the conditions:

$$\theta^2\beta^2 \cdot A/L < 0.0005 \quad (1)$$

$$\theta > \tan^{-1}[(\emptyset 1 + \emptyset 2)/2L1] \quad (2)$$

where A is a constant distance between the reflection surface and the rotation axis, θ is the largest difference angle measured in terms of radians, Ø1 is an effective diameter of the first coupling lens through which the first beam passes, Ø2 is an effective diameter of the second coupling lens through which the second beam passes, β is a transverse magnification of the scanning lens means in the sub-scanning direction, L1 is the smaller one of a first distance between the first coupling lens and the reflection surface and a second distance between the second coupling lens and the reflection surface; and L is a distance between the reflection surface and the image surface.

16. An image forming system comprising:
a multi-beam scanning device; and
a photoconductive medium having an image surface, wherein the photoconductive medium is electrostatically charged, an electrostatic image is formed on the photoconductive medium when subjected to a multi-beam scanning by the multi-beam scanning device, and the electrostatic image is transformed into a viewable image by a development of the electrostatic image using a toner,
said multi-beam scanning device including:
a plurality of light sources which emit multiple beams, the plurality of light sources including a first light source which emits a first beam, and a second light source which emits a second beam;
a plurality of coupling lenses which couple the multiple beams from the light sources, the plurality of coupling lenses including a first coupling lens which couples the first beam, and a second coupling lens which couples the second beam;
a converging lens device which converts the coupled beams from the coupling lenses into converging beams, the converging beams being elongated in a direction corresponding to a main scanning direction and converging only in a direction corresponding to a sub-scanning direction that is substantially perpendicular to the main scanning direction, the converging beams which correspond to the first and second beams forming a difference angle that is largest among difference angles formed by all of the converging beams;
a rotary deflector having a reflection surface which is rotated about a fixed rotation axis, the reflection surface deflecting the converging beams from the converging lens device while the reflection surface is rotated; and
a scanning lens device which scans the image surface of the photoconductive medium in the main scanning direction at a substantially uniform velocity by focusing each of the deflected beams from the rotary deflector into a spot on the image surface,
said multi-beam scanning device being configured to satisfy the conditions:

$$\theta^2\beta^2 \cdot A/L < 0.0005 \quad (1)$$

$$\theta > \tan^{-1}[(\emptyset 1 + \emptyset 2)/2L1] \quad (2)$$

where A is a constant distance between the reflection surface and the rotation axis, θ is the largest difference angle measured in terms of radians, Ø1 is an effective diameter of the first coupling lens through which the first beam passes, Ø2 is an effective diameter of the second coupling lens through which the second beam passes, β is a transverse magnification of the scanning lens device in the sub-scanning direction, L1 is the smaller one of a first distance between the first coupling lens and the reflection surface and a second distance between the second coupling lens and the reflection surface; and L is a distance between the reflection surface and the image surface.

17. A method of forming an image on an image surface of a photoconductive medium in an image forming system, the method comprising the steps of:
providing a multi-beam scanning device including a plurality of light sources which emit multiple beams, the plurality of light sources including a first light source which emits a first beam, and a second light source which emits a second beam, a plurality of coupling lenses which couple the multiple beams from the light sources, the plurality of coupling lenses including a first coupling lens which couples the first beam, and a second coupling lens which couples the second beam, a converging lens device which converts the coupled beams from the coupling lenses into converging beams, the converging beams being elongated in a direction corresponding to a main scanning direction and converging only in a direction corresponding to a sub-scanning direction that is substantially perpendicular to the main scanning direction, the converging beams which correspond to the first and second beams forming a difference angle that is largest among difference angles formed by all of the converging beams, a rotary deflector having a reflection surface which is rotated about a fixed rotation axis, the reflection surface deflecting the converging beams from the converging lens device while the reflection surface is rotated, and a scanning lens device which scans the image surface of the photoconductive medium in the main scanning direction at a substantially uniform velocity by focusing each of the deflected beams from the rotary deflector into a spot on the image surface, said multi-beam scanning device being configured to satisfy the conditions (1) $\theta^2 \beta^2 \cdot A/L < 0.0005$; and (2) $\emptyset > \tan^{-1}[(\emptyset 1 + \emptyset 2)/2L1]$, where A is a constant distance between the reflection surface and the rotation axis, $\theta$ is the largest difference angle measured in terms of radians, $\emptyset 1$ is an effective diameter of the first coupling lens through which the first beam passes, $\emptyset 2$ is an effective diameter of the second coupling lens through which the second beam passes, $\beta$ is a transverse magnification of the scanning lens device in the sub-scanning direction, L1 is the smaller one of a first distance between the first coupling lens and the reflection surface and a second distance between the second coupling lens and the reflection surface; and L is a distance between the reflection surface and the image surface; and forming an electrostatic image on the image surface of the photoconductive medium by subjecting the photoconductive medium to a multi-beam scanning of said multi-beam scanning device, in order to transform the electrostatic image into a viewable image by a development of the electrostatic image using a toner.

* * * * *